Patented Jan. 5, 1954

2,665,218

UNITED STATES PATENT OFFICE 2,665,218

DENTAL CEMENTS

Jacob A. Saffir, Los Angeles, Calif.

No Drawing. Application March 12, 1948,
Serial No. 14,629

5 Claims. (Cl. 106—35)

This invention relates to dental cement compositions. The term dental cements herein is used broadly to include the various types of materials utilized in the prior art to effect dental restorations, embracing within its scope: temporary and permanent cements, silicate cements, translucent silicate cements, often referred to as synthetic porcelains, copper cements, and organic temporary or permanent cementing and cavity filling materials such as temporary stopping and gutta percha compositions and other plastic compositions, including amalgams, which will touch the surface of a natural tooth. Thus the compositions for dental restorations within the purview of the invention relate to dental cements utilizable for the repair and/or the reconstruction of teeth.

One of the great difficulties in present day dental cement media or compositions is their being for the most part slightly soluble in one or more of the following liquids; water, dilute acids, dilute alkalis such as are at times found in the oral cavity, and saliva, itself. While it may take relatively considerable time for these cements to wash out in whole or part, some cement destruction practically always occurs.

Thus, an excellent filling may be cemented into place, but subsequently, the cement may be washed out on the gingival margin, or below the gum margin to an extent sufficient to permit the start of dental decay of the remaining tooth structure.

Of course, when all or a substantial proportion of the cement is washed out, the filling may be loosened enough to fall out, but by that time, the tooth structure may be much damaged, even the death of the pulp may have occurred, and in some cases extractions are finally required because of the amount of destruction which took place under the filling and proceeded unannounced.

This invention comprises a cement or filling material that has in it a salt of fluorine which I have found frequently renders the surface of the tooth it contacts immune to dental decay. By its presence within the tooth it may also render the entire tooth immune to dental decay. More particularly, and pursuant to its preferred embodiments, the invention comprises a dental composition containing a preponderance of a dental cement and a minor proportion of a normal fluoride. In this connection, the reference to a normal fluoride in the present disclosure, as well as in the appended claims, is intended to define a fluoride which directly provides the monovalent F— anion, upon the ionization of the said fluoride in a solution.

When the fluorine containing cement washes out from underneath the filling, as it, too, may do, sufficient immunity is retained in the tooth and no decay will result.

When the inlay or filling is removed, or falls out, the dentine may be discolored, yet it will be found to be generally hard and to show little or no decalcification or caries.

Similarly, when a deep cavity requires a cement base due to its proximity to the pulp, a base made of fluorine containing cement pursuant to the present invention does more than merely insulate the pulp from thermal shock. It tends also to render the remaining thin portion of dentine practically caries proof with the possibility of extending its caries inhibiting effect on the entire tooth.

Of great use is this cement where there are deep pits and fissures in deciduous or permanent teeth and in newly erupting teeth. After these are cleaned out and thoroughly dried, this fluorine containing cement can be worked into all these faults. It is understood, of course, that any decay must first be removed by proper means, such as spoons, excavators, or even a drill.

Where for any reason it is impossible to remove all decay, for example because of delicate health and nerves of the patient, or where the decay is too close to the pulp, then as much as possible should be removed and the fluorine cement placed in position. Frequently this material not only arrests decay but seems to cause a hardening and possible recalcification of the softened dentine.

If fluorine salts are placed in temporary stoppings of gutta percha or other stopping material, an insertion of these for a period of say from one to six weeks may render the tooth quite immune to dental decay and will act to arrest caries.

Similarly, incorporating fluorine salts in the translucent cements, often referred to as silicate cements, or synthetic porcelain cements, has beneficial effects and advantages.

These silicate cements or synthetic porcelain cements are in some mouths soluble to quite a degree. In fact, it has been found that in some cases they must be replaced on the average of every three years or less. They wash out from the gingival margin or other areas, often without being observed by the layman and much damage can result to the thin layer of dentine usually existing between the pulp and filling, as well as to the remainder of the tooth.

The use of fluorine containing translucent cement generally protects the dentine from decay where the filling has dissolved away. Any discoloration noted from contact with decaying food particles is certainly not as objectionable as actual decay and loss of tooth structure.

The washing into the saliva of minute or larger, if desired, quantities of fluorine tends to protect all the teeth and perhaps a few large fillings of this type of material would introduce the minimal fluorine dose into the body for the protection of all the teeth.

Fluorine may be added to the various cements preferably as sodium fluoride, but one can also use potassium fluoride, calcium fluoride frequently referred to as fluorspar, or cryolite which is a double fluoride of sodium and aluminum, or zinc fluoride. Thus any fluorine-containing substance may be utilized which is essentially not toxic at the concentration in which it is embodied in the dental composition or becomes available under the conditions encountered in the oral cavity. The term "available" as it applies to the present invention is intended to designate the property of at least gradual solubility of the substance under the said oral cavity conditions, whether the said prevailing oral cavity conditions be acidic or alkaline and to include within its scope fluoride compounds which are soluble in water.

The fluorine can also be introduced into cement where a liquid and solid portion exist by adding hydrofluoric acid to the liquid portion which generally consists of orthophosphoric acid.

From $1/20$ of 1% to 15% of hydrofluoric acid may be used. The commercial hydrofluoric acid is approximately 48% HF.

Generally the lower percentages are used, depending on the degree of caries and the degree of permanency that is required in the cement. The more hydrofluoric acid the more soluble and less permanent the cement.

While it is also possible to place the fluoride salt in the orthophosphoric acid, which comprises the binding or setting fluid ordinarily utilized in the dental art for applying the dental silicate, zinc phosphate, and other types of dental cements, this is not as desirable as placing it in the cement powder.

A preferred embodiment of dental cement is that referred to as the zinc-oxyphosphate type. These are usually composed of a powder base of zinc oxide or zinc oxide and magnesium oxide, or zinc oxide, magnesium oxide, and silicon oxide, or zinc oxide and copper oxide. They are mixed with a liquid containing mainly phosphoric acid which has been buffered slightly with aluminum and zinc hydroxide.

Into the powdered portion is added from $1/20$ of 1% to 20% or even more of a fluorine salt preferably sodium fluoride. When small amounts such as $1/20$ to $1/4$ of 1% of sodium fluoride are added, the physical properties of the resulting cement is almost the same as before the salt was added. When larger quantities are added, the physical properties insofar as solubility and brittleness is concerned suffer somewhat depending on the amount used. In a deep cavity where a filling will finally cover the cement base so that none of it will be exposed to saliva, heavy concentrations of sodium fluoride may be used.

The addition of fluorides to either the cement powder or liquid may affect the setting time of the cement. The more added, the slower the cement sets. Similarly, the more fluorides in synthetic porcelains, the slower they set.

If possible, the patient should be held in the chair with the filling or restoration kept dry until the cement has completely set. Where this is impossible because of a lack of time and it is desired to send the patient away before the final set, then the fillings or cement margins should be protected by a layer of protective, waterproof varnish, as is the custom today with many of the synthetic porcelain fillings.

When handling a cement or filling material with fluorides as a component part thereof, care should be exercised to avoid spilling on tissues of the mouth. Too close a contact of unset cement particles with the tissues is also undesirable. It is necessary, as well, that the dentist take precautions against the patient's swalling portions of these materials. The dentist should observe the same precautions generally taken in handling arsenic oxide, sulfuric acid or glacial acetic acid in the mouth.

When hydrofluoric acid is used in the liquid, it is better kept in wax containers so that the strength of the hydrofluoric acid is not spent in reacting with the glass of the bottle. For the same considerations, a wax mixing slab is preferable to a glass one—or—a wax coated piece of cardboard or paper can be supplied for mixing.

The addition of up to $1/4$ of 1% of sodium fluoride does not seem to affect an amalgam. In copper amalgams and in amalgams for deciduous teeth, a concentration of up to 1% or more of sodium fluoride may be used.

Having described preferred forms of my improved composition and methods of use for various purposes, it will be understood by those skilled in the art that wide variations may be made from the foregoing detailed disclosures without departing from the spirit of my invention as set forth in the terms of the appended claims. Accordingly what is desired to be secured by Letters Patent of the United States and is claimed as new is:

1. A composition for dental restorations in natural teeth consisting substantially entirely of a dental cement containing a normal fluoride effective for inhibiting dental caries from the group consisting of alkali metal fluorides, alkaline earth metal fluorides, cryolite and zinc fluoride in the approximate concentration range of 0.05% to 20% by weight, said fluoride being adapted to become available under the conditions prevailing in the oral cavity.

2. A composition for dental restorations capable of manifesting caries prevention characteristics in natural teeth consisting substantially entirely of a substance selected from the group consisting of dental silicate cements and dental oxyphosphate cements, said substance containing a normal fluoride effective for inhibiting dental caries from the group consisting of alkali metal fluorides, alkaline earth metal fluorides, cryolite, and zinc fluoride in the approximate concentration range of 0.05 to 20% by weight.

3. A composition as in claim 1, wherein the dental cement comprises a dental zinc-oxyphosphate cement containing sodium fluoride.

4. A composition as in claim 1, wherein the dental cement comprises a dental silicate cement containing sodium fluoride.

5. A composition as in claim 1, wherein the dental cement comprises a dental amalgam containing sodium fluoride in the approximate concentration of 0.25% to 1%.

JACOB A. SAFFIR.

References Cited in the file of this patent

UNITED STATES PATENTS

| Number | Name | Date |
| --- | --- | --- |
| 215,397 | Rollins | May 13, 1879 |
| 1,671,104 | Eberly | May 29, 1928 |
| 1,754,577 | Smith | Apr. 15, 1930 |
| 1,792,200 | Thomsen | Feb. 10, 1931 |
| 1,866,433 | Ward | July 5, 1932 |
| 2,035,140 | Brill | Mar. 24, 1936 |
| 2,071,681 | Brownmiller | Feb. 23, 1937 |
| 2,347,567 | Kresse | Apr. 25, 1944 |

FOREIGN PATENTS

| Number | Country | Date |
| --- | --- | --- |
| 593,172 | Great Britain | 1947 |
| 418,261 | France | 1910 |